United States Patent
Cole

(10) Patent No.: US 7,084,758 B1
(45) Date of Patent: Aug. 1, 2006

(54) LOCATION-BASED REMINDERS

(75) Inventor: Terry Lynn Cole, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 112 days.

(21) Appl. No.: 10/804,308

(22) Filed: Mar. 19, 2004

(51) Int. Cl.
*G08B 1/08* (2006.01)

(52) U.S. Cl. .......................... 340/539.11; 340/539.13; 340/309.16

(58) Field of Classification Search ................ None
See application file for complete search history.

(56) References Cited

U.S. PATENT DOCUMENTS

| | | | |
|---|---|---|---|
| 5,790,974 A | 8/1998 | Tognazzini | 701/204 |
| 6,177,905 B1 | 1/2001 | Welch | 342/357.13 |
| 6,281,797 B1* | 8/2001 | Forster et al. | 340/572.3 |
| 6,678,613 B1* | 1/2004 | Andrews et al. | 701/213 |
| 6,925,603 B1* | 8/2005 | Naito et al. | 715/733 |
| 2003/0009692 A1 | 1/2003 | Smith et al. | 713/201 |
| 2003/0031148 A1 | 2/2003 | Schmidt et al. | 370/337 |
| 2003/0046304 A1* | 3/2003 | Peskin et al. | 707/104.1 |
| 2003/0100309 A1* | 5/2003 | Hull | 455/450 |
| 2004/0207522 A1* | 10/2004 | McGee et al. | 340/539.13 |
| 2004/0249529 A1* | 12/2004 | Kelly et al. | 701/30 |
| 2005/0012611 A1* | 1/2005 | Osman | 340/539.13 |

OTHER PUBLICATIONS

Preliminary Data Sheet for AMD Alchemy™ Solutions Wireless LAN Mini PCI Reference Design Kit.
Preliminary Data Sheet for AMD Alchemy™ Solutions Am1772 Wireless LAN Chipset, 2002.

* cited by examiner

*Primary Examiner*—Benjamin C. Lee
*Assistant Examiner*—Son Tang
(74) *Attorney, Agent, or Firm*—Hamilton & Terrile, LLP; Michael Rocco Cannatti

(57) ABSTRACT

A mobile computing device, such as a personal digital assistant (PDA) or smart phone (102), is equipped with a location detector, such as a WLAN transceiver (112) or global positioning system (GPS) receiver (134), and is programmed with a condition detection program (145) by the user to suppress or modify reminder alerts (212) for an event scheduled in the calendar program (141) if a condition or status associated with scheduled event is detected by the condition detection program (145). The condition detection program (145) is further programmed to issue a reminder alert (210) if the condition or status is not detected.

13 Claims, 2 Drawing Sheets

LOCATION-BASED REMINDERS

BACKGROUND OF THE INVENTION

1. Field of the Invention

The present invention relates generally to the field of wireless networks and cellular or mobile devices. In one aspect, the present invention relates to a portable calendar device having a reminder feature.

2. Description of the Related Art

A variety of computer-based devices include calendar and/or scheduling systems for organizing personal activities by providing a programmable mechanism for recording dates, times and/or descriptions of events or appointments. Early examples of such devices include desktop and laptop computers, palmtop computers, personal digital assistants (PDAs), calculators, organizers, etc.

When loaded on a mobile computerized device, calendar and scheduling systems enable users to maintain their calendar schedules while away from the office, for example on business trips, sales calls, etc. Such calendar and scheduling systems may be implemented with proprietary hardware and/or software contained within such devices, or with commercially available software programs, such as Microsoft Outlook, which provides a calendar and appointment program. Typical calendar and scheduling systems include a reminder feature that unconditionally beeps, flashes, vibrates or provides some other sensory output to indicate that the time for a scheduled event has arrived, or will be arriving at a predetermined interval. For example, a regularly scheduled (for example daily, weekly, etc.) event may have an associated reminder indication whereby an alarm is activated and a reminder message is displayed of an upcoming appointment at a user-selected time. By conventional design, such reminders must be manually deactivated by the user in order to assure that the reminder is received. It can be disruptive for the user to receive and/or deactivate unnecessary reminder messages, such as for events or appointments that the user has already handled. As a result, current calendaring systems provide reminders without regard to whether a reminder is required for the scheduled event, and have no capability to independently detect if changing conditions obviate the need for a reminder.

Therefore, a need exists for methods and/or apparatuses for improving the handling the issuance of reminder alerts so as to minimize disruptions from unnecessary reminders. Further limitations and disadvantages of conventional systems will become apparent to one of skill in the art after reviewing the remainder of the present application with reference to the drawings and detailed description which follow.

SUMMARY OF THE INVENTION

Broadly speaking, a method and apparatus provide conditional reminders for mobile computing devices, such as cell phones, personal digital assistants, portable calendar devices, smart phones, and the like. In a selected embodiment, a mobile computing device determines a condition of the device (such as its location or whether it is being used to make a phone call) and then compares the condition information with a calendar or reminder function to determine if the calendar or reminder function should be disabled or modified.

In accordance with the present invention, a method and apparatus are provided for issuing a reminder alert that is suppressed or modified in response to the detection of a predetermined condition that is associated with a scheduled event. In a selected embodiment, a mobile telecommunication device processes instructions and data to run a scheduling program for storing at least a first scheduled event and issuing a reminder alert at a predetermined interval before the first scheduled event occurs. For example, the scheduling program may be adapted to trigger alert hardware to issue an alert signal in connection with an occurrence of a predetermined event. In addition, the device detects a device condition, such as the location of the device or whether the device has placed a specified call that is associated with the scheduled event, and modifies or suppresses the alert signal in response to detection of the condition. Device location information may be obtained from a GPS detector, WLAN access point, cellular or other network, and the like.

In accordance with various embodiments of the present invention, a method and apparatus provide a mobile communications system for controlling the issuance of a reminder alert that is generated by a scheduling or calendar program. In a selected embodiment, alert hardware is adapted to issue an alert in response to the scheduling or calendar program unless a system detects a system condition, in which case a processing unit prevents the scheduling or calendar program from issuing an alert or otherwise causes a modified alert to issue. In various embodiments, the detected system condition may be the physical position of the system, the use of the system to place a phone call to a predetermined phone number, or any other condition associated with a scheduled event.

The objects, advantages and other novel features of the present invention will be apparent to those skilled in the art from the following detailed description when read in conjunction with the appended claims and accompanying drawings.

DETAILED DESCRIPTION

Figure 1:
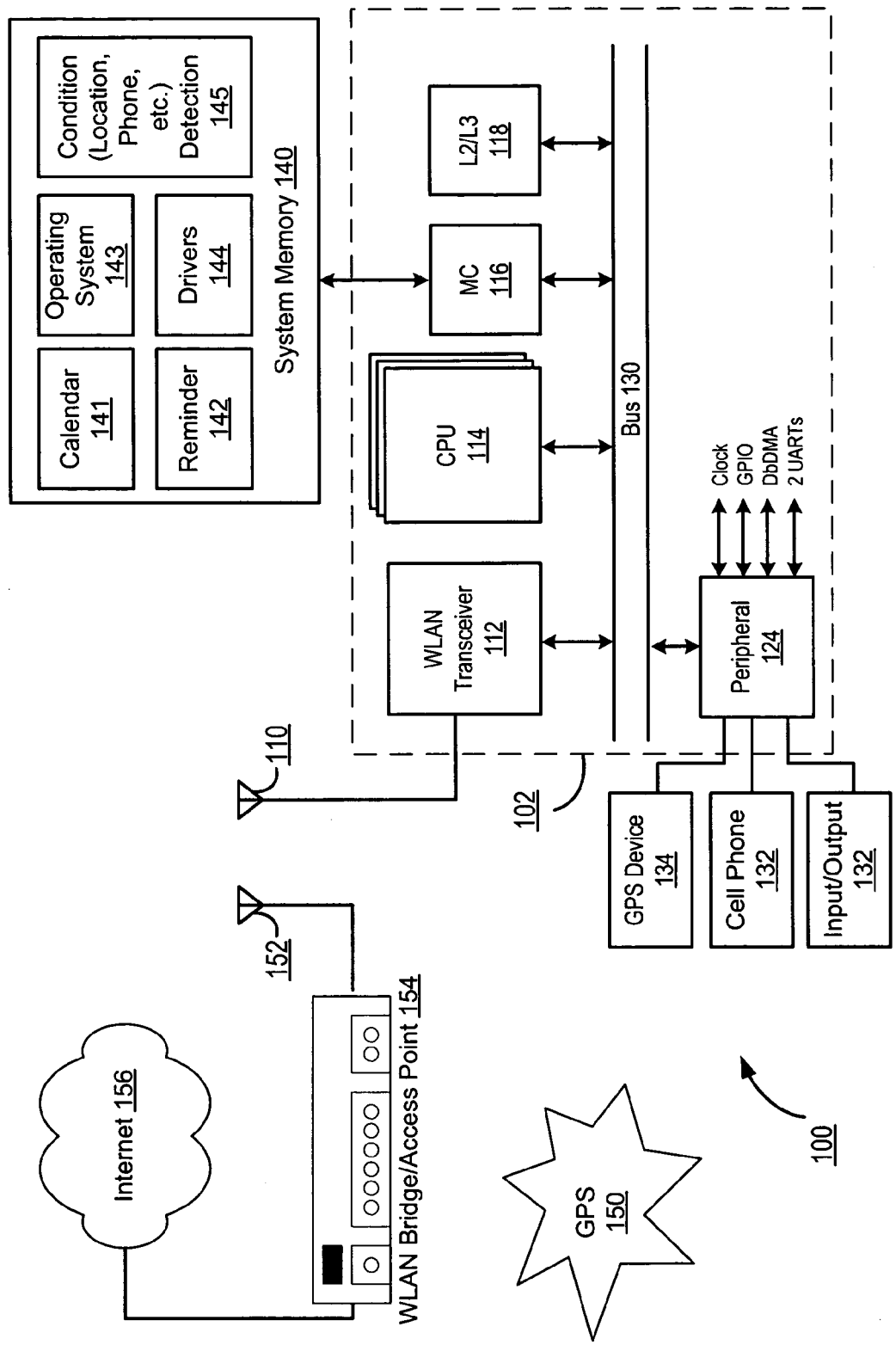
FIG. 1 is a block diagram of a personal calendar system embodiment of the present invention having a conditional reminder feature.

A method and apparatus for providing a conditional reminder is described in connection with an exemplary calendar scheduling system. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In accordance with a selected embodiment, the methods and systems for providing a conditional reminder alert as shown and described herein may be implemented in software stored on a computer-readable medium and executed as a computer program on a general purpose or special purpose computer. The invention, for example, can be implemented in one a single or multiprocessor wireless cellular communication devices, such as GSM (Global System for Mobile Communications), GPRS (General Packet Radio Services), EGPRS (Enhanced GPRS), 3G or EDGE (Enhanced Data GSM Environment) cell phone devices. For clarity, only those aspects of the software germane to the invention are described, and product details well known in the art are omitted. For the same reason, the computer hardware is not described in further detail. It should thus be understood that the invention is not limited to any specific computer language, program, or computer, and that, in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 100 is provided, illustrating one or more embodiments of the conditional reminder feature in accordance with the present invention. In addition to being implemented on conventional computers and/or communications systems, the present invention may also be implemented on mobile devices, such as personal digital assistants, mobile or cellular phones, smart phones and other mobile devices that include programmable capabilities such as telecommunications, global position system (GPS) detection, camera or video imaging, multimedia messaging (MMS), Internet features and the like. In addition, the present invention may be implemented in a mobile computing device using a software modem to communicate in accordance with a wireless communication protocol, such as GSM, V.90, ADSL, Home-PNA, Wireless LAN, etc. With the additional mobility, increased computing power and new telephony and computer-based functions being provided in mobile computer-based devices, improved calendar and scheduling systems may be provided with an intelligent reminder system that provides conditional alerts to the user based upon a detected event or status. The conditional alerts may be provided to a remote device by a central office calendar system, or may alternatively be locally generated at the remote device by a detection agent that senses an event or condition and causes the alert to be modified or cancelled.

In the communications system 100 depicted in FIG. 1, a mobile computing device 102 includes one or more central processing units (CPU) 114, a system bus 130, system memory 140, and a memory controller 116, which is used to manage memory operations with respect to a system memory 140. In selected embodiments, the system memory may be implemented as on-board or off-chip primary (L1), secondary (L2) and/or tertiary (L3) cache memory 118 (illustrated in FIG. 1 for architectural purposes as being directly connected to the bus 130), DDR SDRAM module (s), Flash, RAM, ROM, disk drive memory devices, and the like. For clarity and ease of understanding, not all of the elements making up the mobile computing device 102 are described in detail. Such details are well known to those of ordinary skill in the art, and may vary based on the particular computer vendor and microprocessor type. Moreover, the mobile computing device 102 may include other buses, devices, and/or subsystems, depending on the implementation desired. For example, the mobile computing device 102 may include caches, modems, parallel or serial interfaces, SCSI interfaces, network interface cards, and the like.

In a selected embodiment, the mobile computing device 102 includes a wireless LAN transceiver device 112 which is provided to receive and transmit signals via antenna 110 to and from an access point 154 to the Internet or other computer network 156. Alternatively, the wireless LAN transceiver device 112 may be otherwise implemented as a software modem in the mobile computing device 102, or may be implemented as a GSM (Global System for Mobile Communications), GPRS (General Packet Radio Services), EGPRS (Enhanced GPRS), 3G or EDGE (Enhanced Data GSM Environment) cell phone device, or the like.

Other peripheral devices may be connected to the mobile computing device 102, either directly to the bus 130 or indirectly through a peripheral controller 124 for controlling communications with the device 102. Examples of such peripheral devices include a peripheral GPS receiver device 134 for sensing GPS signals 150, a cell phone or similar telecommunications device 132 and/or various input/output devices 132 (such as a keypad, keyboard, microphone, speaker, analog signal generator, mouse, I/O pad, light or LED device, display, etc.). As will be appreciated, the input/output devices provide a variety of audio, visual or other sensory stimulator devices (e.g., a vibration generator) for providing a reminder alert to the user.

In the illustrated embodiment, the system memory 140 stores data and software programs that are executed and/or processed in connection with the operation of the mobile computing device 102. For example, the system memory stores operating system software 143, drivers 144 and applications relating to scheduling facilities, such as a calendar or scheduling service 141 and a scheduling and reminder service 142. Integrated within or supplemental to these services and/or programs is a conditional detection functionality 145 for use with a scheduling reminder system comprising programs and/or software routines for controlling a scheduling reminder function to take into account one or more detected events.

Figure 2:
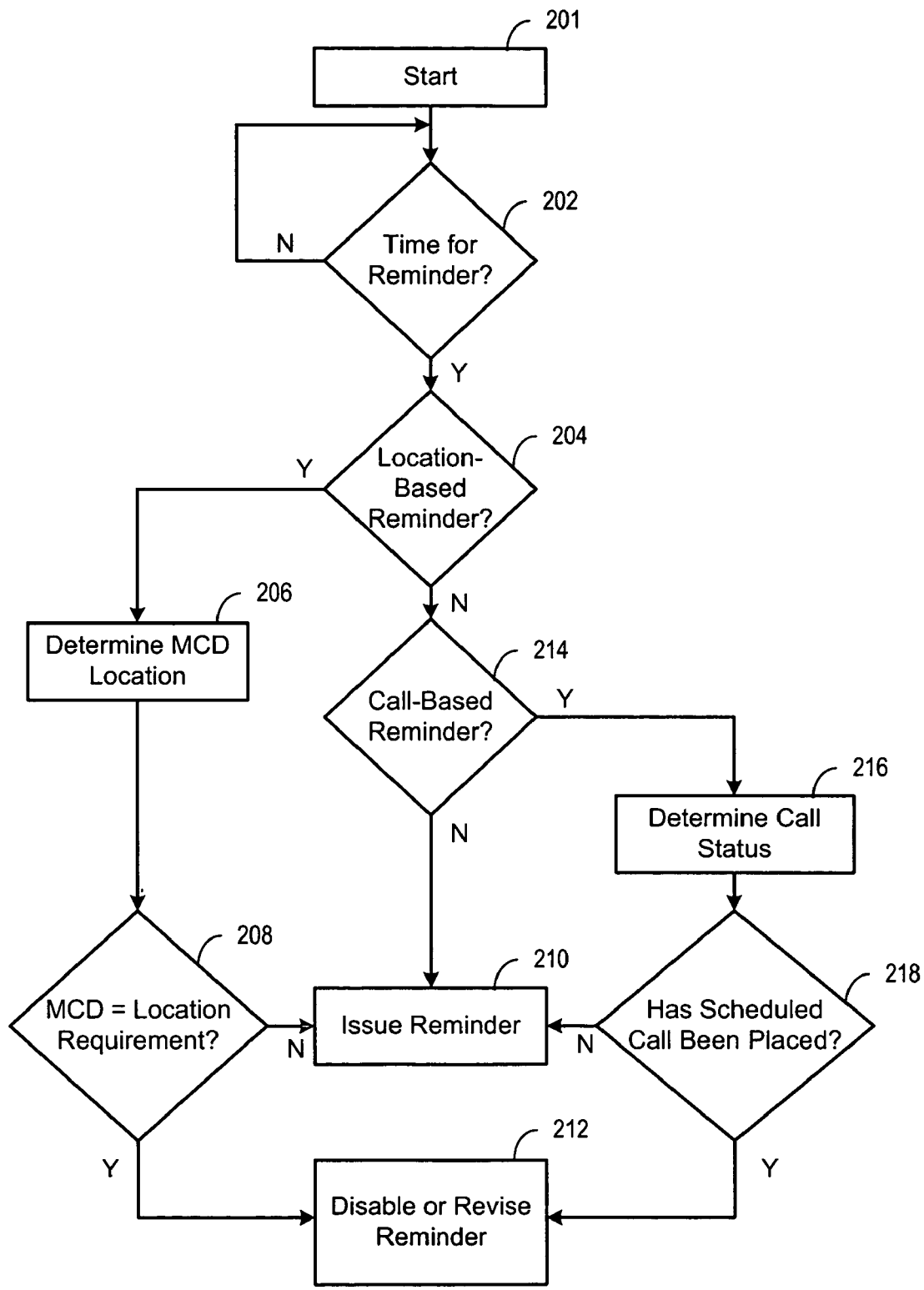
FIG. 2 shows a functional flow diagram of the operations performed by selected embodiments of the conditional scheduling reminder system of the present invention.

The operation of selected embodiments of the conditional scheduling reminder system of the present invention is depicted in functional flow diagram form in FIG. 2. In general terms, the conditional scheduling reminder system of the present invention, upon detecting that a predetermined time has arrived for a reminder to be issued, determines if the reminder can be suppressed or otherwise modified. The conditional reminder may be suppressed upon detecting predetermined status information relating to the condition or operation of the mobile computing device. While it will be appreciated that a variety of conditions associated with the performance or status of mobile computing device may be used to suppress or alter a reminder alert, two illustrative examples are provided with reference to FIG. 2 that have potential use in connection with a new line of products that incorporate GPS positioning and/or cellular telephone features.

According to a first example, upon being invoked in connection with a calendar or other scheduling program, at step 200, a reminder service running on the application processor determines (at step 202) if the time has arrived for a scheduled reminder alert to issue. If not, the reminder service goes to sleep or otherwise waits until the time arrives for a reminder to issue.

When the time for an alert arrives, the reminder service 142 (either alone or by invoking a conditional detection program 145) determines if a predetermined condition associated with the alert has been satisfied. A condition or predetermined parameter may be associated with an alert in a variety of ways by storing the condition or parameter as part of the scheduled event that is entered by the user when scheduling an event with the calendar program. For example, a field may be provided in the event scheduling input screen where the user specifies a parameter, such as a phone number or location, which is associated with the event. There are a variety of other device conditions that may be associated with a scheduled event and detected by a mobile computing device, including but not limited to detecting if a scheduled email has been sent or received, detecting if a scheduled website visit has occurred, detecting if a scheduled phone call has been placed or received, detecting if a scheduled event has been cancelled or re-scheduled, detecting if a follow-up communication has been prepared or sent, etc. In general, any type of status or information that can be measured, accessed or detected in connection with the operation of device 102 may be associated with a scheduled event and used to trigger a suppression or modification of the reminder service.

In the location-based reminder embodiment depicted in FIG. 2, the condition detection program determines if the reminder is a location-based reminder at step 204. An example of a location-based reminder would be a reminder associated with an event that is scheduled in the calendar program to occur at a specific location or address. For example, a calendar entry for a meeting at Acme Restaurant at a given time would have the address or location of the Acme Restaurant specified as a parameter in the calendar event. If the reminder is a location-based reminder, the application processor determines the physical location of the mobile computing device (MCD) at step 206. The location of the device can be determined in a variety of ways. For example, cellular phone devices are able to obtain location information for the device from the cellular network in which it is operating. Cell phones may also use the cellular network to compute its address using triangulation calculations, or may use information that is not generated locally, such as by receiving location information over the cell phone network. Other examples of location determination techniques include using wireless LAN (WLAN) devices that can access location-based information by locating the access point for the WLAN and inquiring from the access point where the WLAN device is located. In addition, GPS receiver circuits can be used to detect and provide geographic coordinate information specifying the device location.

After detecting the MCD location (step 206), the condition detection program determines if the location of the MCD satisfies the location requirement specified for the scheduled event at step 208. Of course, steps 206 and 208 can be combined into a single step or may also be implemented across multiple discrete operations to achieve the same result. If there is not a match, a reminder is issued (step 210) in the form of a sensory alert, such as by displaying an image, buzzing the device, sounding an alarm, ringing the phone, generating an audio announcement using a voice synthesizer, etc. On the other hand, if a match is detected at step 208, this indicates that the user is already at the scheduled meeting, and the user therefore needs no reminder. In this case, the reminder is disabled at step 212 so as to prevent an unnecessary interrupt reminder from issuing. Alternatively, the reminder alert may be revised or altered at step 212 in accordance with a predetermined protocol so that that a less intrusive alert is generated. For example, if an audible alert was originally programmed to issue for a scheduled event reminder, the alert could be changed to provide only a vibration alert if the condition detection program detects that the device is already located at the scheduled meeting place.

Referring back to FIG. 1, a GPS embodiment of the location-based reminder is illustrated as being implemented in a PDA 102 that is connected to a GPS receiver 134 through a peripheral controller. In association with a particular scheduled entry, the calendar program 141 and/or reminder program 142 allows a user of the device to program into the calendar program 141 a specified geographical location or geographical coordinate that is associated with the scheduled entry. The location information for a scheduled event may also be obtained and downloaded from a mapping database, such as by accessing coordinate information over a computer network, such as the Internet 156. In an exemplary embodiment, the calendar program 141 and/or reminder program 142 may include or access a table or other storage element that the user programs with location information to create, delete or change a location entry associated with a scheduled event. A location entry may include a name of a geographical location, geographical coordinates of the location, and a range around the coordinates (e.g., within 0.1 second of latitude and longitude of coordinates, or within 100 meters of coordinates). The location entries may be input via input/output device 132 so that the entered names (e.g., "post office") are associated with the corresponding coordinates by the program. For example, the PDA 102 may be programmed with location entries by taking the PDA 102 to the named location and actuating the input/output device 132 (such as a keyboard) to cause the PDA 102 to store the coordinates presently being generated by GPS receiver 134. However they are input, the location information may be retained for re-use later in connection with other scheduled events.

The connection between PDA 102 and the GPS receiver 132 enables the GPS receiver to provide PDA location or position information. For example, GPS receiver 132 may report the PDA location either periodically or whenever it is polled by PDA 102. Alternatively, PDA 102 may request GPS receiver 134 to inform it whenever they arrive at one or more locations specified by PDA 102. When the calendar program 141 prompts the reminder service 142 to issue a reminder alert on one of the input/output devices 132, the condition detection service 145 retrieves and compares the current location information for the PDA 102 to the specified geographical location information. If there is a match, the PDA 102 has already arrived at the specified geographical location, and the condition detection service 145 prompts the application processor to disable or modify the reminder alert. If there is no match, a normal reminder alert is issued.

In an alternative call-based reminder embodiment that is also depicted in FIG. 2, the condition detection program determines if the reminder is a call-based reminder at step 214, such as a reminder to call someone at a specified time and/or number. If the reminder is a call-based reminder, the application processor determines (at step 216) if a phone number associated with the reminder has been called by the device 102, such as by accessing call record information associated with the cell phone component 132 of the device 102. Of course, the present invention may also implement the call-based reminder functionality entirely within a cellular phone device, or on an aggregated system including PDA, computing and cell phone functions (as illustrated in FIG. 1). Again, steps 216 and 218 can be implemented in fewer or more steps, as desired. If the condition detection program determines that the call to the phone number specified in the scheduled event has already or recently occurred (step 218), then the reminder alert may be disabled or modified (step 212). On the other hand, if the specified number has not been called, the normal reminder alert is issued (step 210). Various types of reminder alerts may be generated, including a visual alert (such as an illuminated light or displayed message), an audio alert (such as ringing the phone or synthesizing an announcement reminder) or any other type of sensory stimulation. In a selected embodiment, the call-based reminder alert 210 may display a message on the input/output 132 offering to call the specified phone number, and the reminder service 142 could configure the cell phone 132 to place a call to the specified phone number and to instruct the callee to stand by until the user joins the call.

The call status determination can be used in other ways. For example, if the condition detection program determines that the user is on the phone with the person specified in the call-based reminder, a reminder alert is not issued, or is issued in a less intrusive (non-audible) manner. In addition, there are other types of call-based determinations that may affect the issuance of the reminder alerts. For example, if it is detected that the cell phone 132 is "off hook," then the condition detection service would determine that the user is in the middle of a phone call, in which case a reminder alert is suppressed or disabled so that it does not interrupt the call.

As shown in FIG. 2, if the reminder is not a condition-based reminder ("no" outcomes from steps 204 and 214), a normal alert is issued (step 210). Once a reminder alert is issued (step 210) or modified (step 212), the program re-starts to await the next scheduled event. In addition, the program may be configured to modify the event entry in the calendar program to reflect that the reminder alert was issued, modified or cancelled, as the case may be.

As will be appreciated, the condition detection function described herein may be implemented as a separate module of software, or may instead call or incorporate portions of other programs, such as when a portion of the operating system is used to provide location services from the cell phone or location services from the WLAN device, as described more fully below. Alternatively, a peripheral device may provide part of the data or processing required by the condition detection function, such as where, for example, the GPS device 134 directly provides location services inherently.

While the present invention may take advantage of enhanced computational power and detection capabilities of the mobile computing device 102, the condition or status of the mobile computing device may also be remotely sensed or detected and used to modify the reminder alert feature. For example, a central office calendar system (not shown) connected to the mobile computing device 102 over a wireless or wired network (i.e., Internet 156) can remotely determine the location or call-status of the mobile computing device by accessing cellular phone record information for the device 102. By comparing the accessed information with condition parameters associated with scheduled events for the device 102, the central office may transmit updates to the reminder service in the device 102 to suppress or modify the reminder alert that is generated at the device 102.

The present invention has been particularly described with reference to FIGS. 1 and 2 and with emphasis on selected product implementation examples, but it should be understood that the figures are for illustration purposes only and should not be taken as limitations upon the present invention. In addition, it is clear that the method and apparatus of the present invention has utility in any application where a reminder may be modified or suppressed upon the occurrence of predetermined conditions. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A mobile computing device, comprising:
   a scheduling facility for maintaining a schedule of one or more timed events, where each timed event has an associated reminder and reminder parameter;
   an alert generator for issuing a reminder alert responsive to the scheduling facility to an intended user;
   a location detector comprising wireless local area network WLAN device for determining a current location of the mobile computing device; and
   a processing unit adapted to execute a condition detection program for interfacing with the location detector and scheduling facility to control the issuance of the reminder alert such that a reminder alert to said intended user is modified if the current location of the mobile computing devices matches the reminder parameter.

2. The mobile computing device of claim 1, where the location detector further comprises a cell phone device.

3. The mobile computing device of claim 1, where the WLAN device obtains the current location of the mobile computing device from an access point.

4. The mobile computing device of claim 1, where the location detector comprises a GPS detector.

5. The mobile computing device of claim 1, where the reminder alert is issued if the current location of the mobile computing device does not match the reminder parameter.

6. The mobile computing device of claim 1, where the alert generator comprises an analog signal generator for generating an audio alert.

7. The mobile computing device of claim 6, where the audio alert comprises a synthesized reminder announcement for the timed event.

8. The mobile computing device of claim 1, where the alert generator comprises a display device for displaying reminder information.

9. The mobile computing device of claim 1, further comprising a telecommunication device for placing a phone call specified by a phone number and a call status detector for determining whether a phone number identified by the reminder parameter has been called by the mobile computing device, where said processing unit is adapted to execute a condition detection program for interfacing with the call status detector and scheduling facility to control the issuance of the reminder alert to an intended user such that a reminder alert to said intended user is modified if the phone number has been called.

10. The mobile computing device of claim 1, wherein the mobile computing device comprises a cell phone device and the location detector determines a current location by receiving location information from a network that is communicatively coupled to the cell phone device.

11. The mobile computing device of claim 1, wherein the mobile computing device comprises a cell phone device and the location detector determines the current location by locally generating location information for the cell phone device.

12. A device comprising at least one recordable medium having stored thereon executable instructions and data which, when executed by at least one processing device, cause the at least one processing device to:

run a scheduling software program for storing at least a first scheduled event at a specified location and issuing a reminder alert at a predetermined interval before the first scheduled event occurs;

determine a physical location of the mobile telecommunication device; and issue a modified reminder alert if the determined physical location corresponds to the specified location.

13. The device of claim 12, comprising a GPS sensor for generating GPS sensor position data, wherein the at least one processing device determines a physical location of the mobile telecommunication device by accessing the GPS sensor position data.

* * * * *